A. M. ERICHSEN.
APPARATUS FOR TESTING METAL SHEETS, &c.
APPLICATION FILED JAN. 6, 1913.
1,094,319.
Patented Apr. 21, 1914.
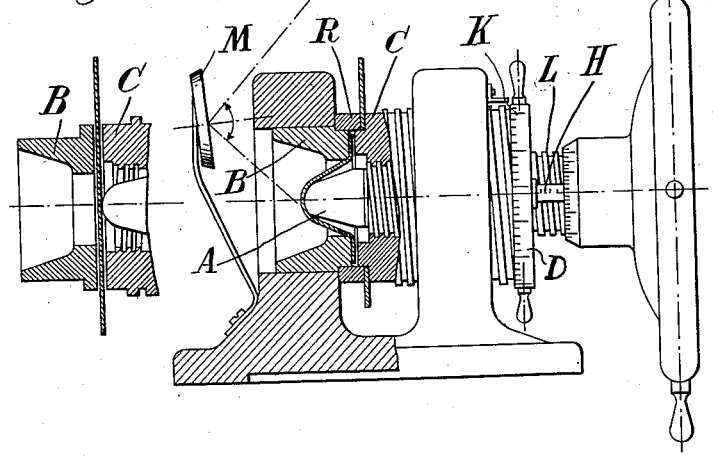
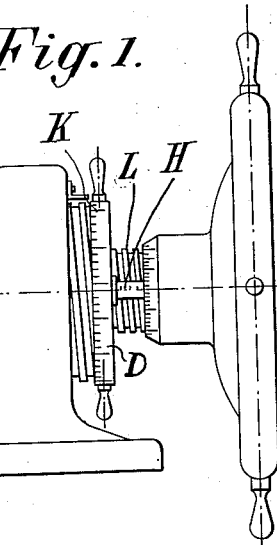
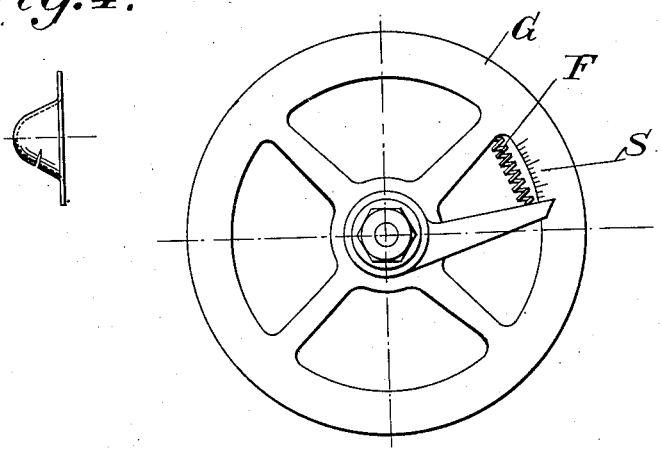
Witnesses:
Inventor:
Abraham Marthinius Erichsen

UNITED STATES PATENT OFFICE.

ABRAHAM MARTHINIUS ERICHSEN, OF BERLIN-REINICKENDORF, GERMANY.

APPARATUS FOR TESTING METAL SHEETS, &c.

1,094,319.  Specification of Letters Patent.  Patented Apr. 21, 1914.

Application filed January 6, 1913. Serial No. 740,518.  REISSUED

*To all whom it may concern:*

Be it known that I, ABRAHAM MARTHINIUS ERICHSEN, a subject of the German Emperor, and resident of Berlin-Reinickendorf, Germany, have invented certain new and useful Improvements in an Apparatus for Testing Metal Sheets, &c., of which the following is a specification.

The present invention relates to an apparatus for testing the resistance to compressive and tensile strains of metal sheets and plates.

According to the invention the metal sheet undergoes the strains to which it becomes submitted in the practice when compressed, extended or stamped, the results of the test depending upon the stress of ultimate tenacity as well as from the resistance of the material.

The improvement consists essentially in that, contrarily to the usual tests performed, the metal sheet to be tested is engaged between a matrix and a holder, a constant free space or play of slight extent being left around said sheet, in order not to impede with the free manifestation of the natural proprieties of the metal but at the same time avoid formation of folds or plaits, and is freely pressed by the die in such a manner that the extending of the metal is gradually performed until the stress of ultimate tenacity is attained. The phases of the test may readily be watched and the resulting numbers may be read directly on the apparatus.

One constructive form of the invention is shown in the accompanying drawing, in which:

Figure 1 is a lateral view of the apparatus partly shown in section. Fig. 2 is the hand wheel for actuating the plunger die. Fig. 3 is a different constructive form of the working parts; Fig. 4 shows the shape of the tested sheet after the test is performed.

Referring to Fig. 1, the metal sheet or plate is engaged in the apparatus and cut, so as to offer a circular shape, by means of the ring R, the matrix B and the extension of the holder C. Then the holder C is screwed in until the scale of the hand wheel corresponds to the thickness of the sheet, a certain play being left to the disk between the parts B and C. This play is obtained by cutting out the compressing surface of the holder C in such a manner that the distance between its outer ring shaped surface and the compressing surface of the ring R is smaller than the distance between the inner ring shaped surface of the holder C and the compressing surface of the matrix B. The cutting of the metal sheet is produced by actuating the hand wheel K. The periphery of wheel K is provided with a scale D, to indicate the resistance of the metal sheet. For instance, if the pitch of the threaded portion of the holder C is five millimeters, the graduations on wheel K will be divided into five parts, each part corresponding to one movement of one millimeter. Then the metal disk undergoes the action of the die A which is driven against said disk when the threaded shaft L is rotated by means of the hand wheel G. As the metal disk, owing to the play, is not firmly maintained between the compressing surfaces of B and C, it is extended by means of the die A. The cone shaped hollow becomes gradually enlarged while the hand wheel G is actuated with a convenient speed until the stress of ultimate tenacity is attained. The penetrating distance of the die corresponds to the nature or resistance of the tested material; it may be read on a scale H. The beginning of the rupture is observed from the operator's seat by means of a mirror M. It is convenient to provide also a scale S on the hand wheel G in order to measure the tension of an interposed spring F, which tension corresponds to the requisite strain for producing the cone shaped hollow and corresponds to the resistance of the material.

When the metal sheet is not cut into a disk, no remaining strip is left between the ring R and the holder C. In this case the metal sheet is inserted between the matrix B and the holder C according to Fig. 3. With this object in view the ring R is conveniently removable. The holder is brought near the metal sheet in such a manner that a constant play, for any thickness of metal sheets is provided, in order that it may freely extend under the action of the die. When graduating the scale, account is taken of the amount of play, which is deduced from the distance between the holder and the matrix.

Having now fully described my said invention, what I claim and desire to secure by Letters Patent, is:

1. An apparatus for testing the resistance to compressive and tensile strains of metal sheets or plates comprising a frame, two bearings provided on said frame, axially in line with each other, a matrix fitting one of said bearings, means provided in the second bearing and separately moving to and fro in said bearing with respect to said matrix for maintaining the metal sheet to be tested and for exerting on said metal sheet the required testing pressure, said latter means having a part spaced from the matrix to permit the metal sheet to have play in the direction of the axis of the apparatus whatever may be the thickness of said sheet.

2. An apparatus for testing the resistance to compressive and tensile strains of metal sheets or plates comprising a frame, two bearings provided on said frame and axially in line with each other, a matrix fitting one of said bearings, the second bearing having inner threads, a hollow, inwardly and outwardly threaded sheet holder holding the sheet to be tested against the matrix during the testing process, and engaging the threads of said bearing, a hand wheel for actuating said holder, the outer edge of said holder having a circular cut, the adjacent edge of the matrix having a corresponding cut, a ring loosely and removably mounted in the groove formed by both said cuts for cutting the metal sheet in two portions, the first one formed by a disk shaped plate, the second annular portion being maintained in its original position between said ring and said holder during the testing process, the front, holding surface of said sheet holder having an annular recess to provide play for said disk shaped metal sheet when engaged between said holder and said matrix, a central peripherically threaded die engaging the inner threads of said concentrically disposed holder, a hand wheel for actuating said centrally disposed die, for extending the metal sheet maintained between said matrix and said holder, an axially directed scale for measuring the axial displacements of said die with respect to the metal sheet to be tested, a coil spring between the die controlling hand wheel and a fixed part of the apparatus in order to measure the strain exerted by said die onto the metal sheet to be tested, a corresponding scale on said hand wheel and a mirror provided at the rear end of said frame in order to allow the operator placed at the opposite end to discern the rupture of the metal sheet to be tested.

3. In a machine of the class described, the combination of a frame, two alined bearings on the frame, a matrix mounted in one of the bearings, the other said bearing being internally threaded, an element operating in the threaded bearing and coöperating with the matrix to confine a plate being tested, said element having threads on its circumference and formed with a central threaded opening, a die on the end of a threaded stem mounted in the central threaded opening in the aforesaid element, and a hand piece on the threaded stem to operate the die in the matrix.

4. A machine of the class described, comprising a hollow matrix, means for loosely holding a plate against the surface of the hollow matrix, a part of said means having a threaded opening in alinement with the hollow matrix, a threaded stem operating in the threaded opening and having on its end a die to force the metal into said matrix, a hand wheel on the threaded stem, and an indicator and scale to indicate the movement of the die.

In testimony whereof I have hereunto set my hand in presence of two witnesses.

ABRAHAM MARTHINIUS ERICHSEN.

Witnesses:
 WOLDEMAR HAUPT,
 HENRY HASPER.